(No Model.) 4 Sheets—Sheet 1.

A. H. MANWAREN.
ELECTRIC METER.

No. 401,191. Patented Apr. 9, 1889.

Witnesses:
Albert Popkins
Jas. L. Skidmor.

Inventor:
Albert H. Manwaren
by his Attorneys
Howson & Howson (No Model.) 4 Sheets—Sheet 2.

A. H. MANWAREN.
ELECTRIC METER.

No. 401,191. Patented Apr. 9, 1889.

Witnesses:
Albert Popking
Jas. L. Skidmore

Inventor:
Albert H. Manwaren
by his Attorneys
Howson & Howson (No Model.) 4 Sheets—Sheet 3.

A. H. MANWAREN.
ELECTRIC METER.

No. 401,191. Patented Apr. 9, 1889.

Witnesses:
Albert Hopkins.
Jas. L. Skidmore.

Inventor:
Albert H. Manwaren,
by his Attorneys
Howson & Howson

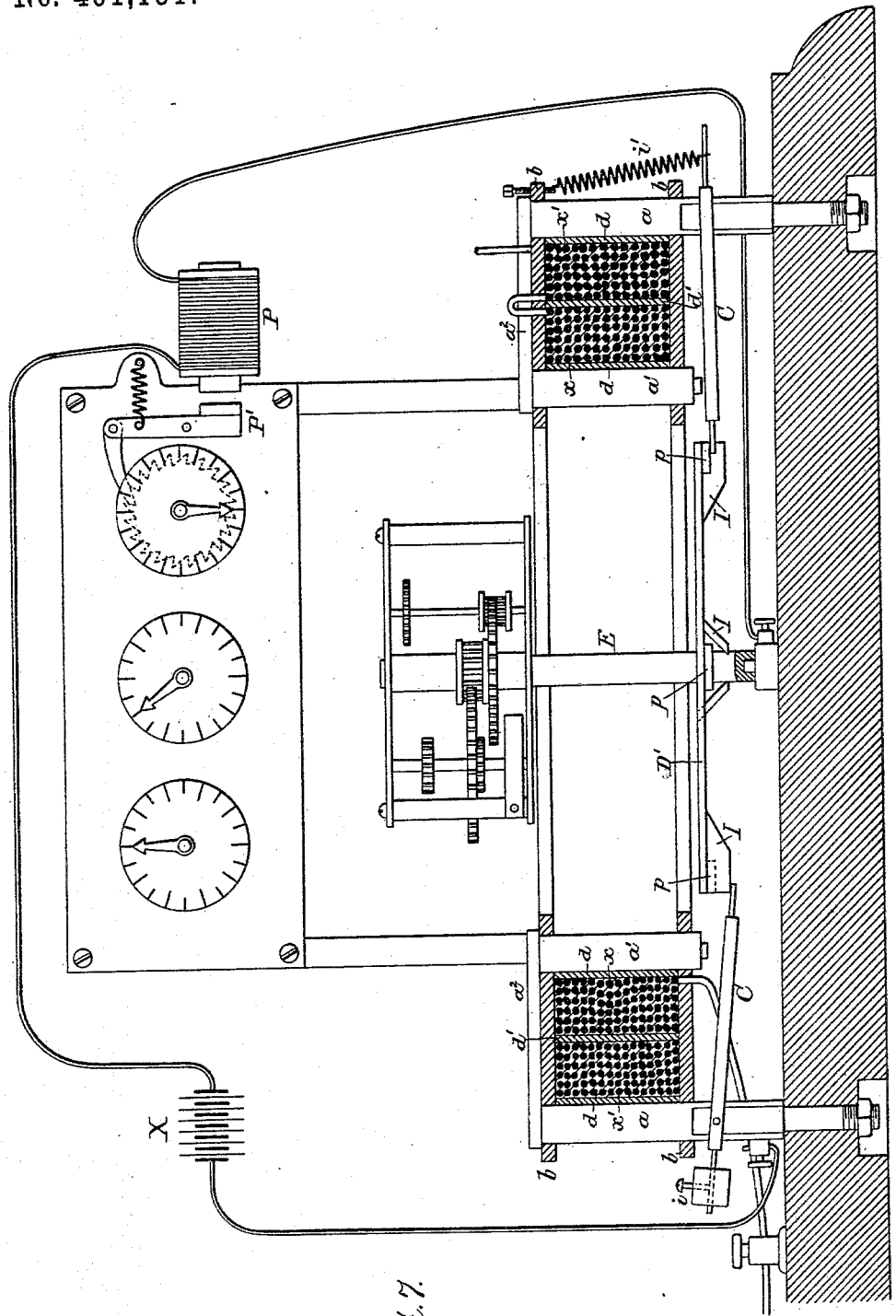

UNITED STATES PATENT OFFICE.

ALBERT H. MANWAREN, OF PHILADELPHIA, PENNSYLVANIA.

ELECTRIC METER.

SPECIFICATION forming part of Letters Patent No. 401,191, dated April 9, 1889.

Application filed August 25, 1888. Serial No. 283,745. (No model.)

*To all whom it may concern:*

Be it known that I, ALBERT H. MANWAREN, a citizen of the United States, and a resident of Philadelphia, Pennsylvania, have invented certain Improvements in Electric Meters, of which the following is a specification.

The object of my invention is to so construct an electric meter as to accurately register the amount of current used in supplying a set of lamps, the meter partaking somewhat of the character of those in which the strength of the current in the main or lighting circuit is the indicating force, and partly of the character of those in which the registration is due to the number of lamps in use, my improved meter being more accurate than those of the first class referred to, and dispensing with the independent circuits and objectionable special wiring which must be resorted to in meters of the second class referred to.

My improved meter is also adapted for use with either continuous or alternating currents.

Figure 1:
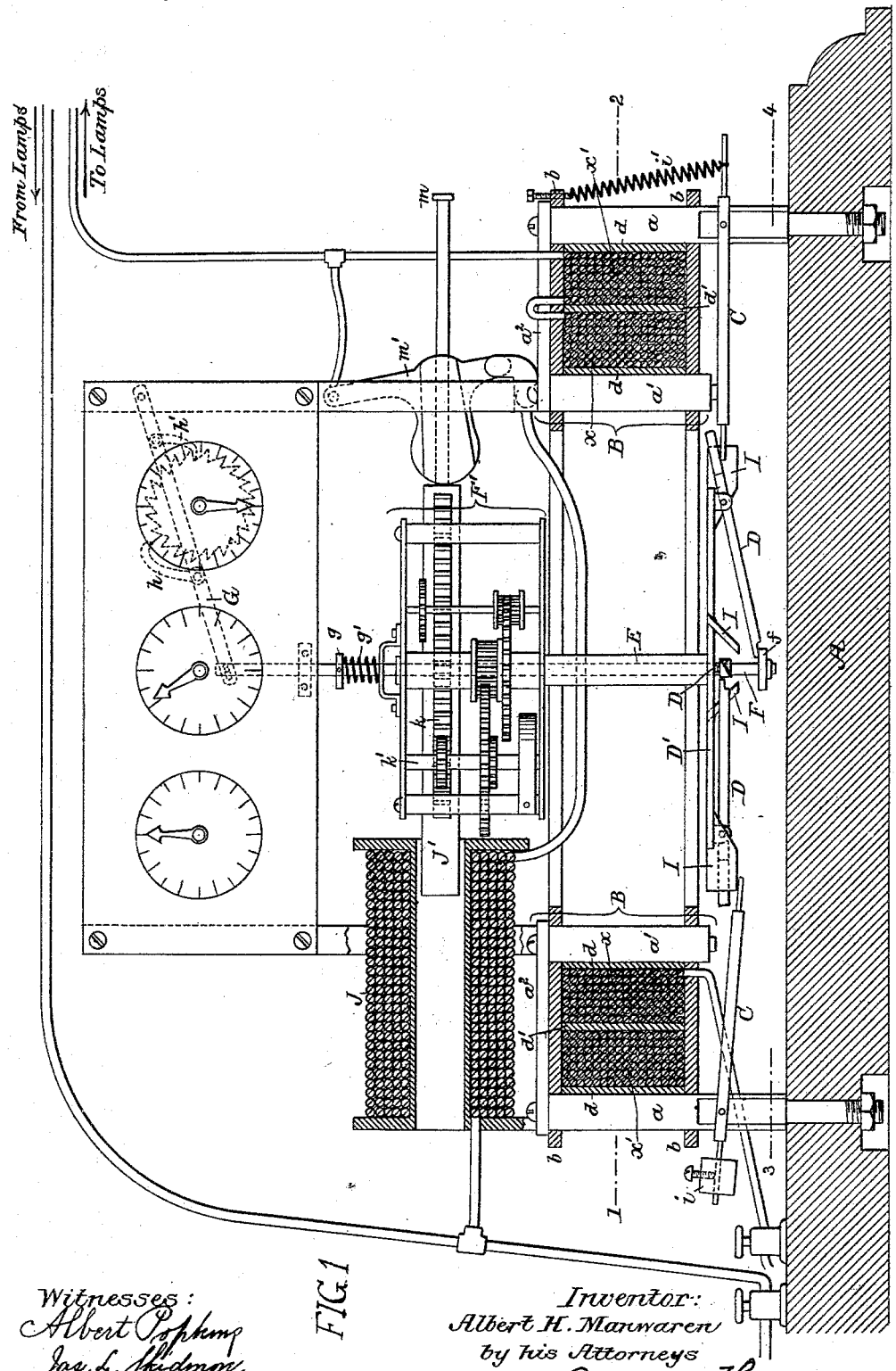
Figure 2:
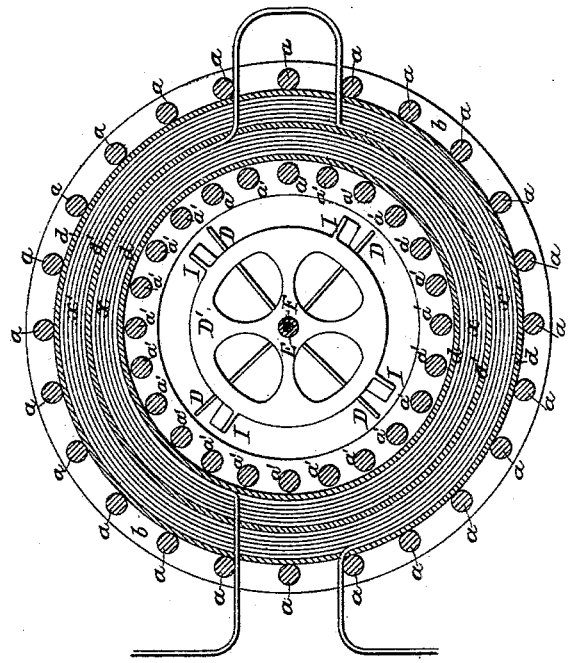
Figure 3:
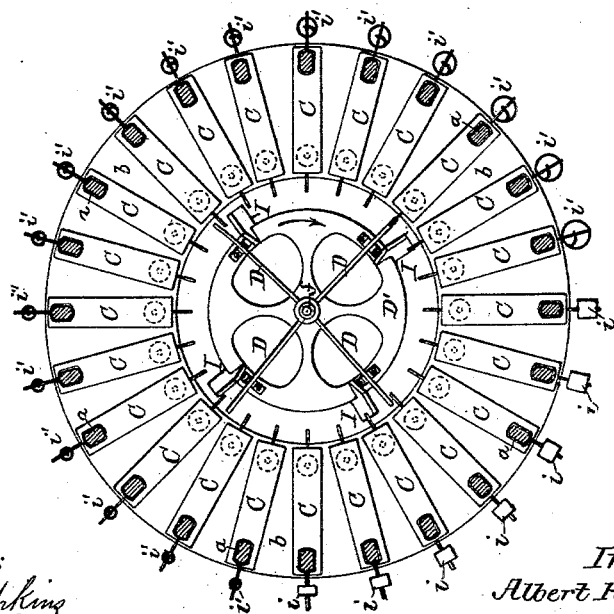
Figure 4:
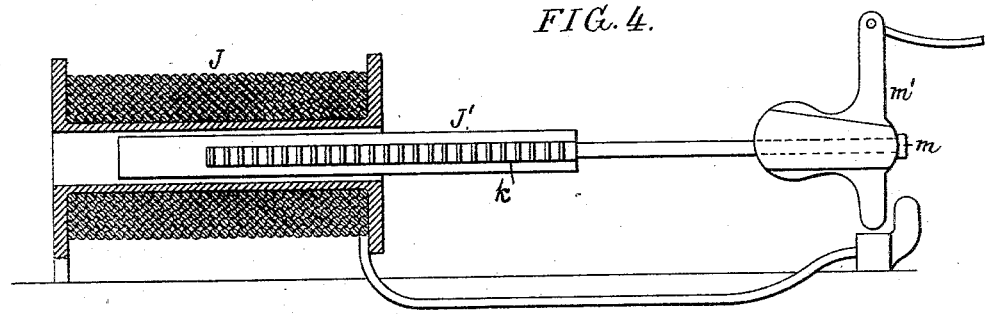
Figure 5:
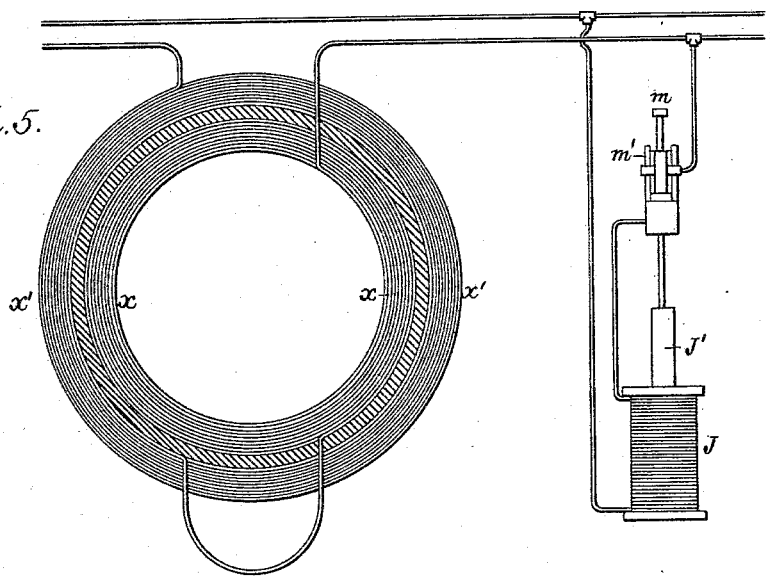
Figure 6:
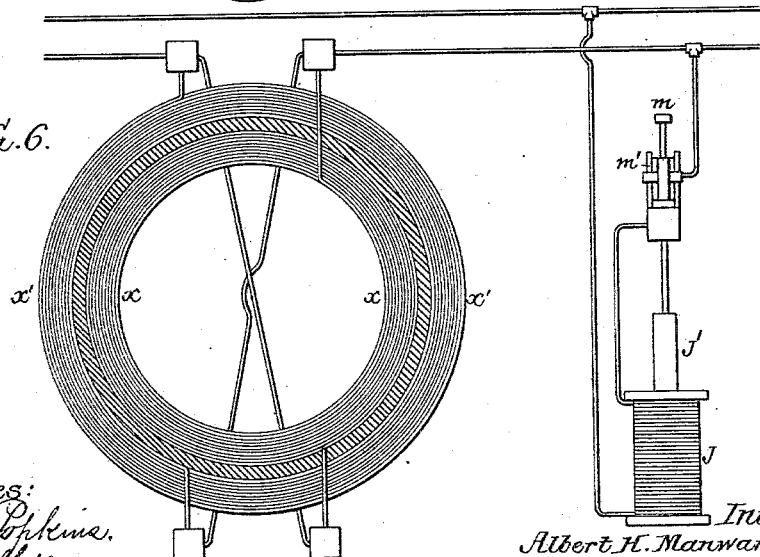

In the accompanying drawings, Figure 1 is a side view, partly in section, of an electric meter constructed in accordance with my invention. Fig. 2 is a sectional view, on a smaller scale, on the line 1 2, Fig. 1. Fig. 3 is an inverted sectional plan view on the line 3 4, Fig. 1. Fig. 4 is a detached view of part of the meter, and Figs. 5 and 6 are views illustrating different forms of winding which can be used. Fig. 7 is a diagram illustrating a modification of the invention.

A is the base of the meter, secured to which is a compound or multipolar magnet, B, comprising a number of posts, $a\ a'$ and connecting-bars $a^2$, this magnet carrying upper and lower rings, $b$, of non-magnetic metal, and inner and outer coils, $x\ x'$, of insulated wire provided with inner and outer insulated wrapping, $d$, and an intermediate insulating-band, $d'$, the coils $x\ x'$ being interposed in the lighting-circuit, so that the passage of the current through these coils effects the energizing of the various poles of the magnet. To each of the posts $a$ is pivoted an armature, C, and when this armature is attracted to the other pole, $a'$, of the magnet the inwardly-projecting end of the armature is brought into the path of the inclined or wedge-shaped end of a lever, D, hung to a disk, D', which is secured to and rotates with the lower end of a tubular shaft, E, driven at a uniform rate of speed by clock-work mechanism F', of any desired character. When the armature is free from the control of the magnet, however, and its inner free end is allowed to fall, said end is out of the path of the inclined ends of the levers D. The inner end of each of these levers rests upon a disk, $f$, carried by the lower end of a rod, F, which is free to slide vertically in the tubular shaft E, and has a collar, $g$, acted upon by a spring, $g'$, which tends to elevate the shaft, the upper end of which is connected to the end of a lever, G, carrying pawls $h\ h'$, which act upon a ratchet-wheel upon the primary shaft of a train of gearing similar to that of any ordinary registering apparatus. When the disk D' is rotated, therefore, the levers D, carried thereby, will be operated in succession by all of the armatures which are attracted so as to project into the path of the ends of said levers, for as each lever is carried past the end of the armature its inclined or wedge-shaped end will be lifted thereby, and the inner end of the lever will be depressed, so as to depress the disk $f$ and its rod F, and thus effect an operation of the lever G, the rod and its disk being raised after every such operation by the action of the spring $g'$. In the present instance the disk D' has four levers, D, and these levers are so set in respect to the armatures C that the levers will be actuated in succession—that is to say, supposing the armature in advance of each lever to be attracted, the first lever will be acted upon by its armature, then the second lever will be acted upon by its armature, then the third lever will be acted upon, and then the fourth, before the first lever is in position to be again actuated, so that no two levers can be acted upon at the same time; hence, supposing that the disk D' makes one revolution per hour, there will on each revolution be an operation of each of the levers D, and a consequent reciprocation of the rod F for each of the armatures held up into the path of the levers, and therefore every quarter of an hour there will be an operation of the rod F for each attracted armature.

It will be evident that more than four levers may be employed; or there may, if desired, be but one lever.

The armatures C are partially counterbalanced by adjustable weights $i$, or are acted upon by springs $i'$, so that they present a gradually-increasing resistance to the action of the magnet. For instance, supposing that there are twenty-five armatures in the annular series, and supposing them to be numbered from 1 to 25, the armature No. 1 would be regulated so as to yield to a certain amount of attraction on the part of the magnet, while armature No. 2 would be weighted so as to require an attractive power twice as great as that of armature No. 1, armature No. 3 requiring a power three times as great, and so on up to the end of the series, armature No. 25 requiring an attractive power twenty-five times as great as that of armature No. 1 in order to overcome its resistance.

As the magnet is energized in direct proportion to the current passing through the coils $x\ x'$, it follows that the number of armatures attracted by the magnet will be in direct proportion to the strength of the current passing through these coils. For instance, if armature No. 1 presents such resistance that it will be attracted by the magnet when the latter is energized by a current sufficient for one twelve-candle-power lamp in the circuit, armature No. 2 would require an attractive force in the magnet equal to a current sufficient to maintain two twelve-candle-power lamps, or one twenty-four-candle-power lamp, and armature No. 25 would require a flow of current representing three-hundred-candle power. If, then, say four twelve-candle-power lamps in the circuit are lighted, only those four armatures representing the first four stages of resistance will be attracted, and there will only be four operations of each lever D on each rotation of the disk D'; but if five more twelve-candle-power lamps are put in the circuit, or if one twelve-candle-power lamp and two twenty-four-candle-power lamps are put in circuit there will be sufficient increase in the energy of the magnet to attract the five armatures next in order, so as to render nine armatures active, and so on, as the lamps are put in or cut out of circuit, will the armatures be attracted or allowed to fall, and the register will indicate the exact candle-power which is being used. An armature after being once attracted by a magnet might, however, have a tendency to remain in this position, even when the force of the current passing through the coils $x\ x'$ was less than it normally should be in order to attract the armature; hence I prefer to place in advance of each lever D on the disk D' a tripper, I, which, as shown, is simply in the form of an inclined blade or plate, which, as the disk is rotated, acts upon the ends of the armatures in succession and depresses the same to a point below the following lever D, the armature being then raised, so as to operate said lever if the magnet is energized sufficiently to effect the lifting of the armature.

In order to effect the automatic winding of the clock-work mechanism F', I provide a solenoid-magnet, J, the coil of which is in a shunt of the lighting-circuit, the core J' of this magnet having a rack, $k$, which engages with a pinion on a spring-shaft, $k'$, of the clock-work gear.

When the current first passes through the coil of the solenoid, the core of the same is drawn into the magnet, so as to turn the spring-shaft $k'$ and wind up the spring. As the core reaches the limit of its inward movement, however, a collar, $m$, at the outer end of the same moves a switch, $m'$, and breaks the circuit through the shunt, as shown in Fig. 4, the magnet, therefore, losing its control over the core, so that as the spring unwinds said core will be moved outward. As it approaches the limit of its outward movement, a shoulder on the core strikes the switch $m'$ and moves the same, so as to again complete the circuit through the shunt, as shown in Fig. 1, thereby causing the solenoid-core to be again attracted and effecting a further winding of the spring-shaft.

The two coils $x\ x'$ may be wound in series, as shown in Figs. 2 and 5; or said coils may be connected up with the terminals in multiple arc, as shown in Fig. 6, the latter mode of connection increasing the power of the magnets and enabling the meter to be used for a greater number of lamps.

Although I prefer, in carrying out my invention, to cause the armatures to act upon levers which practically form elements of the registering mechanism, it will be evident that the essential features of my invention may be embodied in apparatus operating in a different way—for instance, the armatures when raised may make contact with suitably-spaced terminals on the disk D', and thus complete a circuit through a magnet which operates the registering device in a manner similar to that employed in those meters which have an independent meter-circuit for each lamp.

One form of this device is shown in Fig. 7, in which P represents a magnet, the armature P' of which has a pawl for acting on the first of the train of registering-gears. One of the terminals of the battery X includes all of the armatures C, and the other terminal extends to the various contacts $p$, carried by the rotating disk D'. Whenever, therefore, one of these contacts is carried past a raised armature C, the circuit through the magnet P is completed and the registering device is operated.

Having thus described my invention, I claim and desire to secure by Letters Patent—

1. The combination, in an electric meter, of a compound magnet energized by the main or lighting current, and a series of register-operating armatures controlled by said magnet and offering a graduated resistance to the attracting power thereof, the retracting device of each armature being independent of those of the other armatures, substantially as specified.

2. The combination, in an electric meter, of a compound magnet energized by the main or lighting current, a series of armatures controlled by said magnet and offering a graduated resistance to the attracting power thereof, and a moving disk or plate carrying elements of the registering apparatus, whereby said elements are carried past the successive armatures, so as to be acted upon by those armatures which are attracted by the magnet, substantially as specified.

3. The combination, in an electric meter, of a compound magnet energized by the main or lighting current, a series of register-operating armatures controlled by said magnet and offering a graduated resistance to the attracting power thereof, and a traversing tripper for acting upon the armatures in succession and moving them away from the attracting-pole of the magnet, all substantially as specified.

4. The combination, in an electric meter, of a compound magnet energized by the main or lighting current, a series of armatures controlled by said magnet and offering a graduated resistance to the attracting power thereof, and a traversing carrier forming part of the registering mechanism and having elements which coact with the armatures and are so arranged in respect thereto that each of said elements will be acted upon in succession before the first is again acted upon, all substantially as specified.

5. The combination of a compound magnet energized by the main or lighting current, a series of armatures controlled by said magnet and offering a graduated resistance to the attracting power thereof, the ratchet-lever of a registering device, a rod connected to said lever, one or more actuating-levers acted on by the armatures and acting upon said rod to operate the register, a spring for restoring the rod, and a rotated carrier for the actuating-levers, all substantially as specified.

6. The combination of a compound magnet, a series of register-operating armatures governed thereby and offering a graduated resistance to the attracting power thereof, and a double-coil wrapping for said magnet interposed in the main or lighting circuit, whereby the coils may be used either in series or multiple arc, all substantially as specified.

7. The combination of the clock-work mechanism of an electric meter, a solenoid-coil having a core geared to the spring-shaft of said clock-work mechanism, and a switch whereby the coil is thrown into and out of circuit by the movement of the core, all substantially as specified.

In testimony whereof I have signed my name to this specification in the presence of two subscribing witnesses.

A. H. MANWAREN.

Witnesses:
EDWARD M. RILEY,
HARRY SMITH.